Feb. 2, 1971  L. G. KUHLMAN  3,560,319

ADHESIVE TAPE

Filed June 11, 1968

INVENTOR.

BY Leo G. Kuhlman

Wood, Herron & Evans

ATTORNEYS

United States Patent Office 3,560,319
Patented Feb. 2, 1971

3,560,319
ADHESIVE TAPE
Leo G. Kuhlman, 1109 Audubon Road,
Park Hills, Ky. 41011
Filed June 11, 1968, Ser. No. 736,159
Int. Cl. B32b 15/02; C09j 7/04
U.S. Cl. 161—89      2 Claims

ABSTRACT OF THE DISCLOSURE

This invention discloses an adhesive tape that has a strippable protective backing consisting of a backing layer and a net cloth joined thereto by a pressure sensitive adhesive. The tape is reusable and includes a cloth base coated with adhesive on at least one of its surfaces.

---

This invention relates to a novel adhesive tape and more particularly to an adhesive tape which is reusable.

There are many instances where it is desirable to reuse an adhesive tape. One such instance is where an adhesive tape is used to secure a wig to the head of its wearer. Adhesive tapes have been used for such purpose for many years. They have commonly included a cloth backing covered on both sides with a pressure sensitive adhesive, and a strippable protective backing to cover one of the adhesive layers. Such tape is usually wound into a roll so that the one unprotected adhesive layer is in contact with the strippable protective backing. To use such a tape the user pulls away from the roll a piece of tape of the desired length, removes the protective backing, and presses the tape against the inside of the wig. He then positions the wig upon his head and gently presses it thereto so that the exposed adhesive layer of the tape sticks to his head and holds the wig in place.

These conventional tapes have been reusable only for a limited number of times. It has been one of the principal objectives of my invention to provide a strippable protective backing for an adhesive layer that will protect the adhesive layer during the interim period between the first use and subsequent uses. It has been another important objective of mine to provide a strippable protective backing for an adhesive layer which can be firmly secured to the adhesive layer but yet can be easily removed without destroying the tenacious qualities of the adhesive.

I have fulfilled those objectives by providing a strippable protective backing that has three layers, an outer backing layer, an adhesive layer and a cloth net layer. The adhesive layer secures the outer backing layer and cloth net layer together. In use, the protective backing is brought into contact with the adhesive layer to be protected. It tenaciously adheres to the protected adhesive layer partly because of the adhesive forces of the protected adhesive layer, partly due to the embedding of the cloth net layer into the protected adhesive layer, and partly because of the adhesive forces exerted by the adhesive used to secure the net cloth to the outer backing layer when an adhesive of the pressure sensitive type is used. My strippable protective backing is readily strippable from the protected adhesive layer and because of the minimum number of points of contact between the two a minimum amount of adhesive is removed from the protected adhesive layer. Not only is my strippable backing easily removable, but it improves the adhesive characteristics of the adhesive it protects by exposing fresh surfaces of the adhesive to the head of the wear when it is removed.

I will now describe in detail my novel adhesive tape in connection with the drawings in which:

FIG. 2 is an elevational view of my tape showing the strippable protective backing removed from the adhesive layer sought to be protected and the cloth net pulled away from the outer backing layer of cloth it is secured to.

Figure 2:
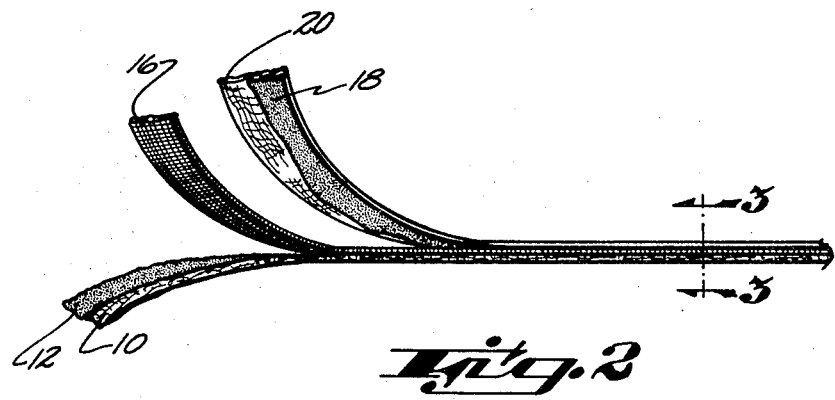
Figure 3:
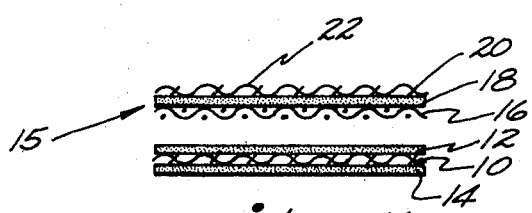
FIG. 3 is a cross-sectional view taken along the line 3—3 of FIG. 2 with the protective backing separated from the protected adhesive layer.

Referring now to FIGS. 2 and 3, I will describe the preferred embodiment of my invention, an adhesive tape that is especially adapted for securing a wig to the head of a wearer. As previously mentioned though, this is not the only use of my novel tape.

Both the top and bottom sides of a cloth layer 10 are coated with a layer 12 and 14 of a conventional pressure sensitive adhesive. These adhesives are well known and the use of any specific one is not necessary for the successful practice of my invention. In use, one of the layers, such as layer 14, will be in contact with the head of the wearer and the other, such as layer 12, will be in contact with the wig. The thickness and width of the cloth layer 10 and the adhesive layers 12 and 14 have not been found to be critical.

The strippable protective backing, designated generally by the number 15, consists of a net cloth layer 16, a pressure sensitive adhesive 18 and an outer backing cloth layer 20. The pressure sensitive adhesive 18 is of conventional type. Materials other than cloth can be substituted for the outer backing layer 20. The net cloth layer 16 is secured to the backing cloth layer 20 by the pressure sensitive adhesive 18. Preferably the adhesive 18 covers the entire, or substantially the entire, face of the outer backing cloth layer 20 to which it is applied. The net cloth layer 16 consists of a mesh-like cloth fabric.

The strippable protective backing 15 covers and protects the adhesive layer 12. When the backing 15 is in place, the net cloth 16 is partially embedded in the adhesive 12. Some of the adhesive 18, in addition to the adhesive 12, also serves to keep the strippable protective backing in place since it exudes through the interstices of the net cloth 16.

Figure 1:
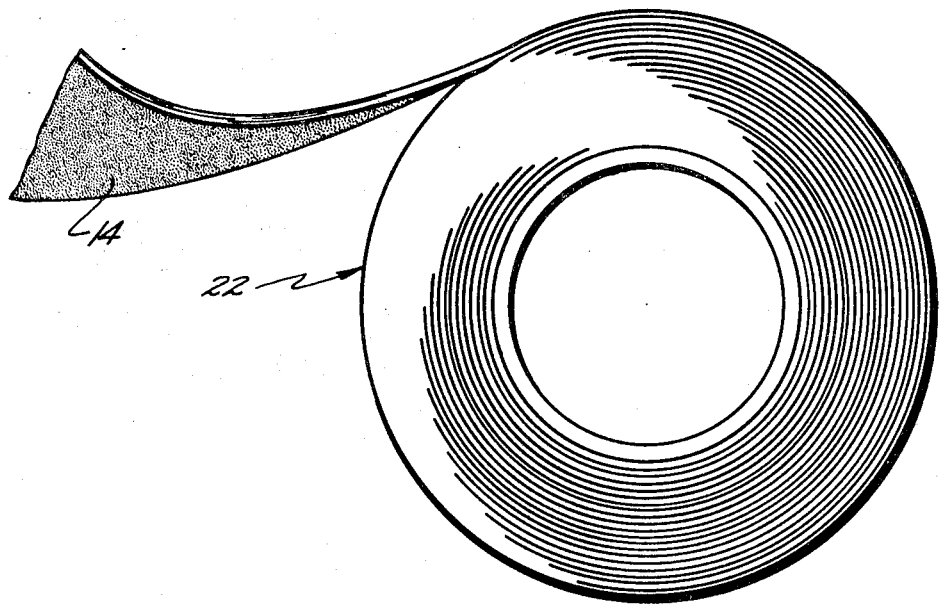
FIG. 1 is an elevational view of a roll of my novel adhesive tape.

Referring now to FIG. 1, my adhesive tape is shown wound into a roll. When the tape is wound in this manner, face 22 of the outer backing cloth layer 20, the face not covered with adhesive, serves as the protective backing for the adhesive 14 that would normally otherwise be exposed. It is preferable when the adhesive tape is rolled up in this manner to use a smooth and starchy material for layer 20. If the tape is used in strips, then another means of protecting the adhesive 14 must be provided.

To use my tape, a piece of the desired length is removed from the roll. The strippable protective backing 15 is then removed by pulling it away from the adhesive 12. One of the adhesive layers 12 or 14 is pressed against the inside of the wig and the wig is placed on the head of the wearer. The exposed adhesive layer 12 or 14 secures the wig in place. When the wig is removed, the strippable protective backing 15 can be put back in place. The strippable protective backing protects the adhesive 12 and is easily removable for the reasons heretofore set forth.

Having thus described my invention, I claim:

1. A reusable adhesive tape comprising,
   a cloth layer, said cloth layer having at least one of its faces coated with an adhesive,
   a strippable protective backing substantially co-extensive with cloth layer covering said adhesive when said tape is not in use and adapted to be stripped therefrom prior to use, said strippable backing including a backing layer and a net cloth layer, said net cloth being secured to said backing layer by a layer of adhesive which covers substantially the entire surface of said backing layer, and said net cloth layer being in contact with the adhesive on said cloth layer when said strippable backing covers said cloth layer.

2. The tape of claim 1 wherein said cloth layer has both of its faces coated with a pressure sensitive adhesive.

References Cited

UNITED STATES PATENTS

| | | | |
|---|---|---|---|
| 2,093,910 | 9/1937 | Farrell | 161—406UX |
| 2,278,673 | 4/1942 | Savada et al. | 161—82 |
| 2,463,244 | 3/1949 | Carter | 117—68.5X |
| 3,232,291 | 2/1966 | Parker | 128—156 |

ROBERT F. BURNETT, Primary Examiner

W. A. POWELL, Assistant Examiner

U.S. Cl. X.R.

117—68.5, 122; 161—167, 406